E. A. HAWTHORNE.
LIGHTING APPARATUS.
APPLICATION FILED APR. 6, 1918.
1,369,892.
Patented Mar. 1, 1921.
2 SHEETS—SHEET 1.
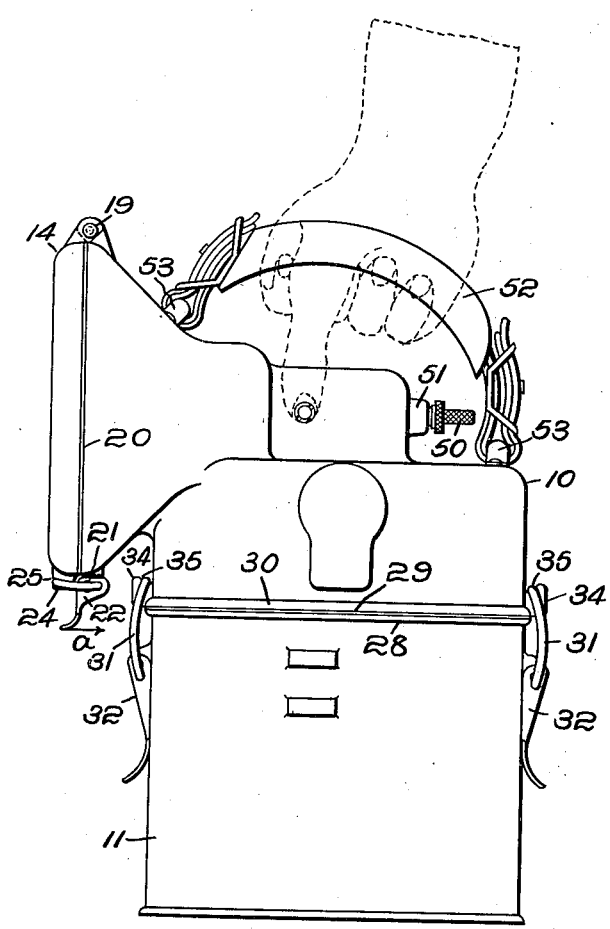
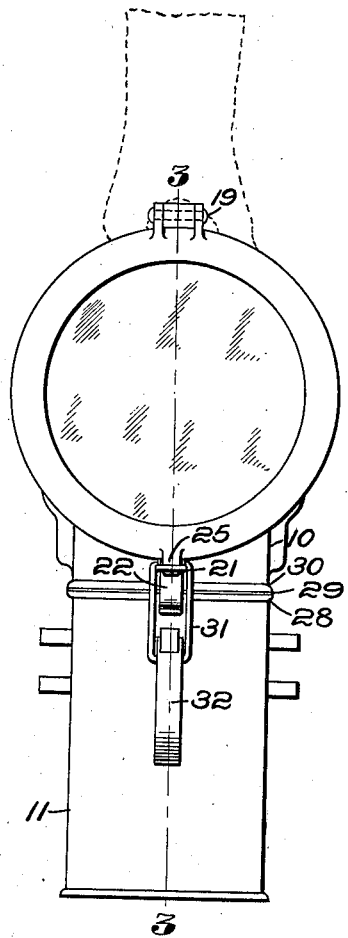
Inventor:
Ellsworth A. Hawthorne,
by Emery, Booth, Janney + Varney
Attys.

E. A. HAWTHORNE.
LIGHTING APPARATUS.
APPLICATION FILED APR. 6, 1918.
1,369,892.
Patented Mar. 1, 1921.
2 SHEETS—SHEET 2.
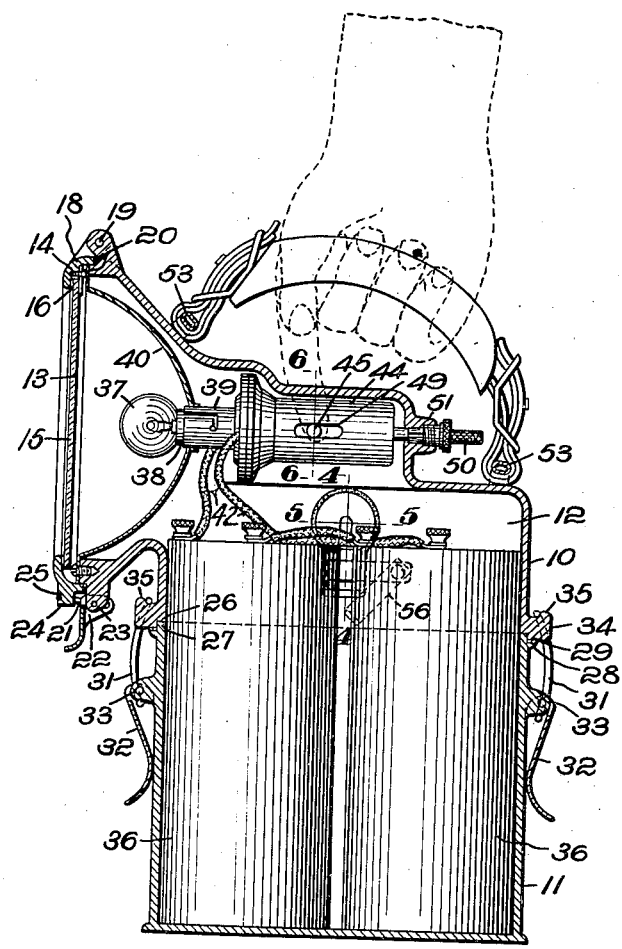
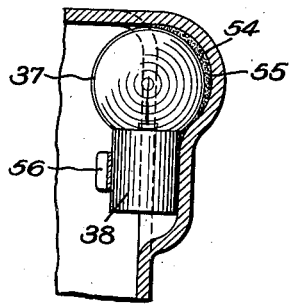
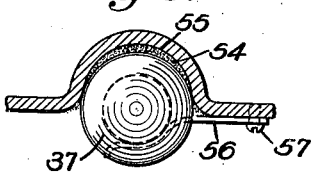
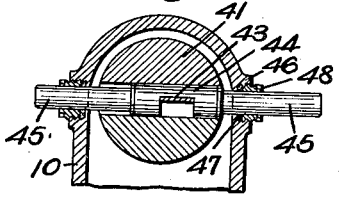
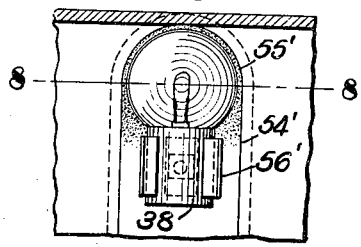
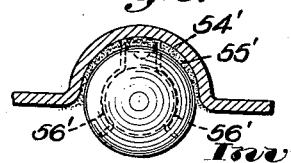
Inventor:
Ellsworth A. Hawthorne
by Emery, Booth, Janney + Varney
Attys.

UNITED STATES PATENT OFFICE.

ELLSWORTH A. HAWTHORNE, OF BRIDGEPORT, CONNECTICUT.

LIGHTING APPARATUS.

1,369,892. Specification of Letters Patent. Patented Mar. 1, 1921.

Application filed April 6, 1918. Serial No. 227,108.

*To all whom it may concern:*

Be it known that I, ELLSWORTH A. HAWTHORNE, a citizen of the United States, and a resident of Bridgeport, county of Fairfield, and State of Connecticut, have invented an Improvement in Lighting Apparatus, of which the following description, in connection with the accompanying drawings, is a specification, like characters on the drawings representing like parts.

This invention relates to lighting apparatus, and is more especially, though not exclusively concerned with a portable self-contained electric lighting unit adapted to the use of batteries for a current supply, and having many features of utility for field and general use in situations calling for portability, high illuminating power, ease of control, protection from water and dirt, facility of replacement of bulbs and batteries, and accessibility of parts for purposes of adjustment and repair.

My invention will be best understood by reference to the following description, when taken in connection with the accompanying drawings of one specific embodiment thereof, while its scope will be more particularly pointed out in the appended claims.

In the drawings:

Figure 1 is a side elevation of a lighting apparatus embodying my invention;

Fig. 2 is a front elevation of the same;

Fig. 3 is a sectional view on line 3—3 of Fig. 2;

Fig. 4 is a detail sectional view on an enlarged scale on line 4—4 of Fig. 3;

Fig. 5 is a detail sectional view on an enlarged scale on line 5—5 of Fig. 3;

Fig. 6 is a detail sectional view on an enlarged scale on line 6—6 of Fig. 3;

Fig. 7 is a detail elevation, partly in section, illustrating the modification of the spare bulb-holder; and Fig. 8 is a sectional view on line 8—8 of Fig. 7.

Referring to the drawings, and to the embodiment of my invention which is illustrated therein, I have there shown a portable electric lighting apparatus having a casing comprising upper and lower separable parts 10 and 11, providing a chamber 12 partly in each, and having a preferably lateral light-emitting opening 13 in the upper part. This opening may be provided with a suitable door 14, having a glazing 15 closing said opening. In the present example, as a means to prevent the entrance of moisture and dirt from the joint between the door and glazing, I have provided a packing ring or gasket 16, against which the glazing is held by a retaining ring 17 secured in place by a plurality of screws 18, which serve to hold the packing ring under compression. The door may be otherwise appropriately mounted in place across the opening 13, but in the present example, is suspended by means of a hinge 19 preferably at the upper side thereof, so that when released, it will gravitate to its closed position. As a means to exclude moisture and dirt, I have herein provided a packing ring or gasket 20, interposed between the door and the body of the casing. Any suitable means may be provided to secure the door in its closed position, and to maintain the packing ring or gasket under compression, but in the present example, I have shown a fastening device comprising a preferably bifurcated link 21 and a preferably bifurcated lever 22, the latter being fulcrumed on a lug 23 on the lamp casing body, while the link is pivoted at one end to said lever, and at its other end is suitably connected to the door 14, as by providing the latter with a lug 24 having a depression 25, in which the link is seated. The arrangement of the pivotal points is such that in the normal position shown in the drawings, the door is securely locked, but may be released by simply swinging the lever 22 in the direction indicated by the arrow *a*. Preferably the link is resiliently extensible in the direction of its length, and to that end is herein somewhat bow-shaped, as shown in Fig. 1. Thus it is evident that when the lever 22 is swung toward its normal position, the resulting toggle action of the lever and link will place the latter under tension.

The upper and lower casing parts 10 and 11 may be secured to each other in any suitable manner, but in the present example are provided with interengaging parts suitably constructed to keep them in proper registration with each other, and at the same time to exclude moisture and dirt. To this end, I have herein provided the upper part 10 with a recess 26 (see Fig. 3) to receive a corresponding lip 27 at the upper edge of the lower part 11, and have provided the latter with a laterally projecting lip or flange 28 preferably serving as a seat for a packing ring or gasket 29, upon which rests a laterally projecting lip or flange 30 on the upper part 10. As a means to draw the upper and lower parts firmly together, and to compress the packing ring or gasket therebetween, I may provide fastening devices similar to that described in connection with the door. In the present example, I have shown two such fastening devices, each comprising a bifurcated link 31 and a bifurcated lever 32, the latter being fulcrumed on the lug 33, while the link is pivoted at one end to said lever and at its other end is suitably connected to the upper part 10, as by providing the latter with a laterally-projecting lug 34, having a seat 35 for the link. These fasteners operate in a manner similar to those hereinbefore described in connection with the door, and hence no further description is deemed necessary.

The lower part of the chamber 12 may serve as a convenient space for one or more, herein two, batteries 36, which may be and are in the present example common dry cells, although the casing is equally well adapted to the use of other types, such for example as storage batteries. The upper portion of the chamber provides a convenient place for a suitable light source 37, which may be and is herein an electric incandescent bulb having a usual base 38 seated in a socket 39, the latter extending axially through an appropriate reflector 40, preferably of the parabolic type, the arrangement being such as to concentrate the light rays and project them through the light-emitting opening 13.

The upper portion of the chamber may also serve as a convenient inclosure for an appropriate light-source controlling means, herein an electric switch 41 suitably connected, as by wires 42, to the batteries 36, and acting in any appropriate way to make and break a circuit to the lamp 37. The switch herein selected for illustration, and which *per se* forms no part of my invention, is provided with a switch member 43, shown in Fig. 6, operated by an actuator 44 having push buttons 45, the latter extending laterally through the upper part 10 of the casing. If desired, the push buttons may simply be extended through openings provided in the casing, but I prefer to provide suitable means to exclude moisture and dirt at these points, and to that end have herein provided stuffing boxes 46, having packing rings 47 and glands 48 whereby the packing rings may be kept tight and provide non-leaking joints about the push buttons.

In the present example, the switch 41 is provided with a longitudinal slot 49 to permit the same to be moved axially for the purpose of focusing the bulb 37 with relation to the reflector 40, and there is provided a suitable focusing rod 50 accessible at the exterior of the lamp casing to permit the lamp to be focused at will. The proper focus when thus secured may be maintained by the provision of an expansible and contractible threaded bushing 51 screwed into the casing and arranged to pinch the focusing rod 50. These focusing devices, however, form no part of my present invention.

In order to facilitate carrying the lantern about from place to place, I have provided a suitable handle 52, from which the casing depends when the lantern is carried. Preferably, the handle is flexibly connected to the upper part 10 of the casing, as by the provision of suitable yokes 53 best shown in Fig. 1, extending through the ends of the handle. It should here be noted that the handle 52 and push buttons 45 are associated with each other in such a way that the push buttons are available for manual control by the hand while grasping the handle and carrying the casing, this being best accomplished by placing the push buttons below and intermediate the ends of the handle 52, and within reach of the thumb and fingers, as illustrated by the dotted outlines of a hand in Figs 1 and 3. On examination of these views, it should be apparent that when one of the buttons is to be pressed, the operator may reach down with his thumb, as illustrated in Fig. 1, and push the same inward while carrying the lantern, and, on the other hand, the other button may be operated by reaching down with the finger as illustrated in Fig. 3. Pressure on the one button may serve to complete the lamp circuit, while pressure on the other serves to break the circuit. It should therefore be evident that the lantern may be carried about, pointed this way and that, and the light switched on and off quickly, by the use of one hand.

Preferably, the lantern is provided with suitable means for the storage of spare bulbs for replacement purposes in case of the failure of a bulb in use, and to that end I have herein provided the upper part 10 of the casing with two spare bulb chambers 54, best shown in Figs. 4 and 5, each suitably shaped to receive a bulb and preferably having a cushion 55 of appropriate material to prevent the bulb from breaking. As a means to retain the bulb in place in the form shown in Figs. 4 and 5, I may provide a preferably yielding lever 56 normally extending across the base 38 of the bulb, and pivoted at 57. When it is desired to remove the bulb from its chamber, the lever may be swung from the horizontal position illustrated in Fig. 3 to the oblique position shown therein.

In the modification shown in Figs. 7 and 8, I have shown a bulb-receiving chamber 54′, having a cushion 55′ and provided with a pair of bulb-retaining clips 56′ adapted to embrace the lamp base, as best shown in Fig. 8, thereby to hold the bulb in place.

If desired to move the bulb, this may be done by forcibly withdrawing the lamp base from between the spring clips, the latter yielding laterally in an obvious manner to allow the lamp base to be withdrawn. Preferably, the free ends of the clips 56' are spread or flared apart, as shown in Fig. 8, to permit the entrance of the lamp base to cause the clips to spring apart to receive the lamp base when the latter is forced into place.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts nor to its specific embodiment herein shown, but that extensive deviations from the illustrated form or embodiment of the invention may be made, without departing from the principles thereof.

Having thus described one form or embodiment of my invention, what I claim and desire by Letters Patent to secure is:

1. A hand lantern comprising, in combination, a light-source, a reflector associated therewith, a source of energy for said light-source, a casing in which said light-source, said reflector and said source of energy are housed, a carrying handle upstanding from said casing and extending lengthwise of the axis of said light-source and reflector, and light-source controlling means including a focusing element beneath said handle and extending into a space bounded by said handle and said casing.

2. In a lighting apparatus, the combination of a casing comprising upper and lower separable parts providing a chamber partly in each, a lamp, a reflector and focusing device housed within the upper part, and lamp energy supply means housed within the lower part of said chamber.

3. In a lighting apparatus, the combination of a casing comprising upper and lower separable parts providing a chamber partly in each, a lamp and lamp control means housed within the upper part of said casing, and lamp supply means housed partially within the lower part of said casing, projecting upwardly therebeyond and removable therefrom by grasping the upwardly projecting portion of said lamp supply means.

4. In a lighting apparatus, the combination of a casing comprising upper and lower separable parts providing a chamber partly in each, a lamp, lamp control means, lamp-focusing means and reflector housed within the upper part of said casing, lamp supply means housed partially within the lower part of said casing and projecting upwardly therebeyond into the upper part of said casing.

5. In a lighting apparatus, the combination of a casing comprising upper and lower separable parts providing a chamber partly in each, and having a lateral light-emitting opening in the upper part, a battery housed in the lower part, and a lamp reflector and lamp focusing means housed in the upper part.

6. In a lighting apparatus, the combination of a casing comprising upper and lower separable parts providing a chamber partly in each and having a lateral light-emitting opening in the upper part, a battery housed in the lower part, a lamp and lamp-carrying switch housed in the upper part and carrying said lamp, and conducting means connecting said battery to said switch and permitting the latter to be shifted and to carry said lamp without disturbing such connection with said battery.

7. In a lighting apparatus, the combination of a casing comprising upper and lower separable parts providing a chamber partly in each and having a lateral light-emitting opening in the upper part, a battery housed partially in the lower part and projecting therefrom into said upper part, a lamp and lamp-carrying switch housed in the upper part, and current conducting means extending in an upward direction from said battery to said switch and comprising a shiftable connection permitting said switch to move said lamp.

8. In a portable electric lighting plant, the combination of an outer casing, a lamp-bulb supported on the internal surface of said casing, and a bulb-retainer holding said bulb in place in said surface.

9. In a portable electric lighting plant, the combination of an outer casing having an abutment therein, a lamp-bulb disposed against said abutment, and a bulb-retainer comprising a yielding member holding said bulb in place against said abutment.

10. In a portable electric lighting plant, the combination of an outer casing having a bulb-receiving abutment therein, a lamp-bulb disposed against said abutment, and a bulb-retainer, comprising a member normally overlying the base of said bulb, holding said bulb in place against said abutment.

11. In an apparatus of the class described, the combination of a casing having a bulb-receiving recess, a lamp-bulb disposed in said recess, and a bulb-retainer, comprising a lever adapted to be swung into and out of position to hold said bulb, holding said bulb in place in said recess.

12. In an apparatus of the class described, the combination of a casing having a bulb-receiving recess, a lamp-bulb disposed in said recess, a cushion for said bulb, and a bulb-retainer holding said bulb in place in said recess.

13. In an apparatus of the class described the combination of a casing, a switch disposed in said casing and having a push-button threaded thereonto and projecting through said casing to the exterior, and a bushing and gland encircling and forming a guide for said push-button and threaded into said casing.

In testimony whereof, I have signed my name to this specification.

ELLSWORTH A. HAWTHORNE.